United States Patent
Hagale et al.

(10) Patent No.: US 7,945,028 B2
(45) Date of Patent: May 17, 2011

(54) COALESCENCE OF VOICE MAIL SYSTEMS

(75) Inventors: Anthony Richard Hagale, Smithville, TX (US); Jason E. Kelley, Austin, TX (US); Ryan Rozich, Austin, TX (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 12/049,310

(22) Filed: Mar. 15, 2008

(65) Prior Publication Data

US 2008/0159493 A1    Jul. 3, 2008

Related U.S. Application Data

(63) Continuation of application No. 11/366,683, filed on Mar. 2, 2006.

(51) Int. Cl.
*H04M 1/64* (2006.01)
(52) U.S. Cl. ..... 379/88.22; 379/67.1
(58) Field of Classification Search ..... 379/67.1, 379/88.22
See application file for complete search history.

(56) References Cited

U.S. PATENT DOCUMENTS

| | | | |
|---|---|---|---|
| 5,463,674 A | 10/1995 | Gillig et al. | 379/59 |
| 6,529,500 B1 | 3/2003 | Pandharipande | 370/352 |
| 6,704,394 B1 * | 3/2004 | Kambhatla et al. | 379/67.1 |
| 7,254,612 B2 * | 8/2007 | Green et al. | 709/206 |
| 2003/0120745 A1 | 6/2003 | Katagishi et al. | 709/217 |
| 2003/0148775 A1 | 8/2003 | Spriestersbach et al. | 455/456 |
| 2003/0220835 A1 | 11/2003 | Barnes, Jr. | 705/14 |
| 2004/0097218 A1 | 5/2004 | Vossler | 455/418 |

OTHER PUBLICATIONS

E. N. Herness et al., "WebSphere Application Server: A foundation for on demand computing," *Systems Journal*, vol. 43, No. 2, 2004, pp. 213-370.

* cited by examiner

*Primary Examiner* — Curtis Kuntz
*Assistant Examiner* — Amal Zenati
(74) *Attorney, Agent, or Firm* — Yee & Associates, P.C.; David A. Mims, Jr.

(57) ABSTRACT

A coalescence voice mail service provider enables a user to access all of the user's voice mail systems implemented within the various telecommunications systems the user has accounts with. Using any one of the telecommunications devices of the user, the user accesses voice mail from any one or more of the user's cell phone, home phone, work phone, PDA, home computer and work computer. A voice mail broker communicates with each of these different voice mail systems to collect voice mail messages and send messaging for manipulating such voice mail messages to and from each of the telecommunications systems. Such a system provides the user with a single interface for accessing the user's diverse voice mail systems.

13 Claims, 6 Drawing Sheets

| USER ID | SERVICE PROVIDER | PIN | PARAMETERS |
|---------|------------------|-----|------------|
| JOHN SMITH | CINGULAR | 12345 | deleteWhenRead |
| JOE STEIN | SPRINT PCS | 54321 | saveWhenRead |
| ⋮ | ⋮ | ⋮ | ⋮ |

Fig. 6

COALESCENCE OF VOICE MAIL SYSTEMS

CROSS REFERENCE TO RELATED APPLICATIONS

The present application is a continuation application of pending U.S. patent application Ser. No. 11/366,683, which was filed on Mar. 2, 2006, which is assigned to the assignee of the present invention. The present application claims priority benefits to U.S. patent application Ser. No. 11/366,683.

TECHNICAL FIELD

The present invention relates in general to telecommunications systems, and in particular, to voice mail systems.

BACKGROUND INFORMATION

Voice mail systems have evolved over the years from simple answering machines using cassette tape cartridges to today's fully digital software driven systems, which have become an essential part of both our personal and business lives. Additionally, our tools for communicating with each other have multiplied to where it is not uncommon for a person to have a home phone, work phone, cell phone, home computer, work computer, and a PDA, such as a Blackberry™ or other handheld device. Even stay-at-home moms will communicate with friends, school, children and spouses using the home phone, their cell phone, and their home computer.

Further, the technologies used to implement these various telecommunications devices have begun to blur together, mostly because of the digital transformation of telephone systems. A still further adaptation is occurring with the blending of voice and data over the same digital networks. The result of these advances is the ability of a person's telephones and computers to communicate with each other and share information. Digital wireless phones and handheld devices are essentially small computers using digital signal processing to enable a user to have voice communications with one another. Moreover, software is available for use on laptop and desktop computers enabling the user to utilize the computer as a telephone.

A problem that has surfaced as a result of the foregoing is the proliferation of multiple voice mail boxes associated with each of these telecommunication devices. For example, a person could have a separate voice mail box they would have to check for each of their home phone, work phone, cell phone, home computer, and work computer. Having to individually access each of these voice mail systems can be a burden. Therefore, what is needed in the art is a system for coalescing a plurality of voice mail systems, providing a user an ability to access all of their voice mail systems from any one of the user's telecommunications devices.

SUMMARY OF THE INVENTION

The present invention addresses the foregoing needs by providing a voice mail broker that communicates with each of a user's voice mail systems. The voice mail broker utilizes interface adapters for communicating with each of the technologies of the telecommunications systems associated with each of the voice mail systems so that notification messages and stored voice mails can be passed back and forth between the voice mail broker and each of the voice mail systems. With such a system, a user could use any of his/her telecommunications devices to access the user's voice mail systems through the voice mail broker. Thus, the user could listen to voice mail messages stored on each of the user's voice mail systems, and could also manage and perform maintenance of such voice mail systems, such as retrieving messages, deleting messages, saving messages, forwarding messages, etc., using the broker.

The foregoing has outlined rather broadly the features and technical advantages of the present invention in order that the detailed description of the invention that follows may be better understood. Additional features and advantages of the invention will be described hereinafter which from the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates an example of database table 190 shown in FIG. 1.

DETAILED DESCRIPTION

In the following description, numerous specific details are set forth such as specific network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
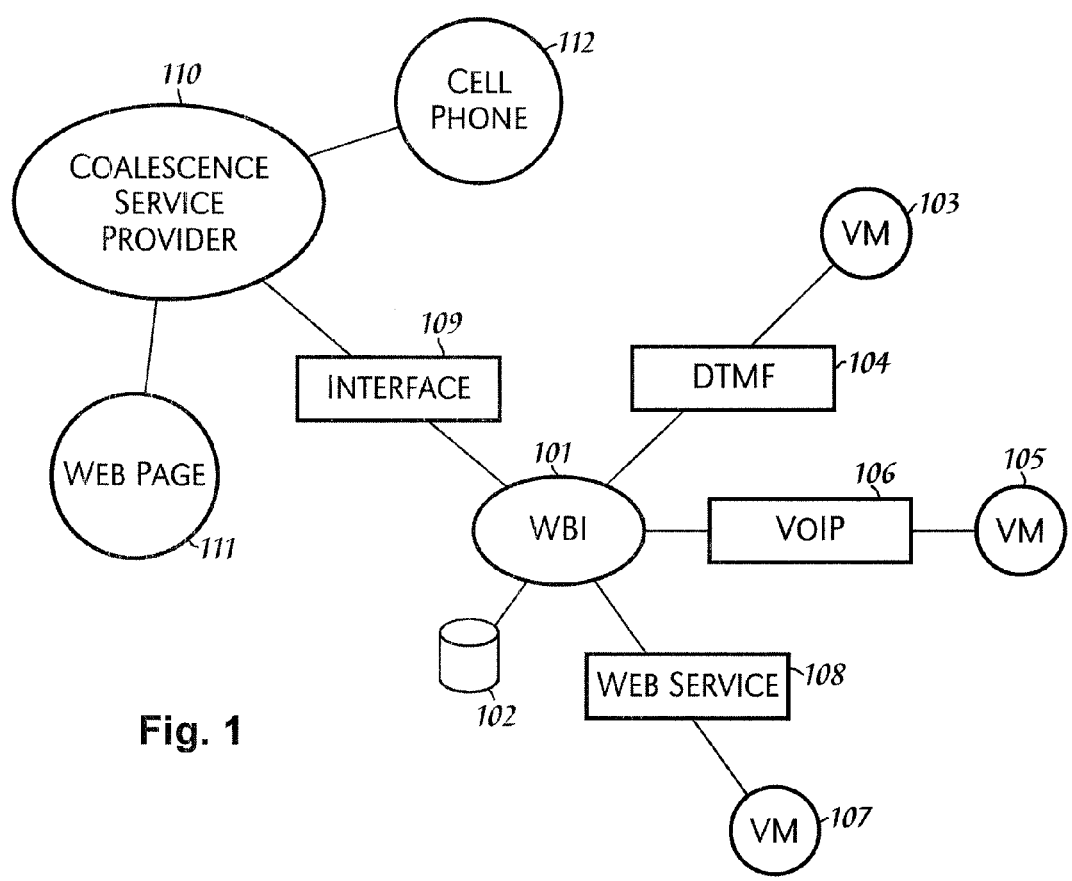
FIG. 1 illustrates an exemplary system for coalescing voice mail systems in accordance with an embodiment of the present invention.

FIG. 1 illustrates an exemplary configuration where a voice mail broker communicates with a plurality of voice mail systems to enable a user to access and manipulate all of such voice mail systems. Though the system illustrated in FIG. 1 shows several different types of telecommunications systems coupled to the voice mail broker, the present invention should not be limited to such telecommunications systems. Instead, any telecommunications system can be accessed with the present invention through the use of a proper interface adapter, enabling the voice mail broker to communicate with the telecommunications systems.

A third party service may provide a business integration hub, such as a Websphere™ Business Integration Server (WBI) 101, coupled with newly created adapters 104, 106 and 108-109 to interact with various voice mail services and telecommunications systems. An adapter may be written for each such service, (such as Sprint PCS™, IBM™ Corporate Voice Mail, etc.) and integrated into the hub as a data-connect point just as existing technology adapters are utilized. Each adapter is responsible both for the control data associated with a given service, as well as the serializing/deserializing of the data format for each service. That is, a "Sprint PCS™ adapter" is able to retrieve voice messages from a Sprint PCS™ telecommunications system, as well as delete and save them based on actions mandated by the hub/voice mail broker. For some adapter/services, a simple "record audio data" function may be required, whereas others may be coupled with more modern technologies, such as Voice over IP (VoIP) or a common voice mail data standard, which would make integration easier. An exemplary data standard for voice data could be a WAV or MP3 file, which contains the audio component of the VoIP, with the corresponding control data being represented as an XML structure, for example, as a WebSphere™ Business Integration "Business Object."

The hub 101 has a traditional work flow in which it is capable of communicating with the various technology adapters in an integrated fashion to achieve a global result. That is, the hub may constantly poll the various providers for new voice mail (or simply check when the user explicitly requests it) and coalesce the voice mails into a standard "business object" format for voice mail data on the hub (described in more detail below). This voice mail data may be then be considered generic, and can be manipulated in various ways as described below.

Hub 101 includes the voice mail broker described below. A database 102 may be utilized to store user preferences, such as the identification of the various voice mail accounts the user desires to access. Database 102 may include a list of entries for all of the various service providers that a user would subscribe to. For example, the primary key of the table may be a combination of user ID and service provider. As illustrated in FIG. 6, each row in the database table may describe an individual service provider and all of the various login/control parameters for the given provider (e.g., the row might contain (name, Cingular™, PIN:12345, deleteWhenRead). Functions are implemented within the hub 101 for creating voice mail, retrieving voice mail, updating voice mail, deleting voice mail, etc. In the exemplary configuration illustrated in FIG. 1, a voice mail system 103 may be accessed by the voice mail broker in hub 101 with a DTMF interface adapter 104. In such a system, DTMF tones are needed for the voice mail broker in hub 101 to communicate with the voice mail system 103. Another voice mail system 105 may be accessed over a data network using VoIP protocols, through the use of a VoIP adapter 106. Another voice mail system 107 implemented on the Internet may be accessed by the voice mail broker in hub 101 using a web service adapter 108 using HTML protocols.

A service provider may implement the foregoing by subscribing users who wish to access their other voice mail systems. Such a coalescence service provider 110 may then communicate through an interface adapter 109 with the voice mail broker in hub 101. Thus, it is not necessary that such a coalescence service provider 110 be the same entity as the provider of the voice mail broker process 101. Well-known security measures may be implemented for securing such access processes.

Figure 2:
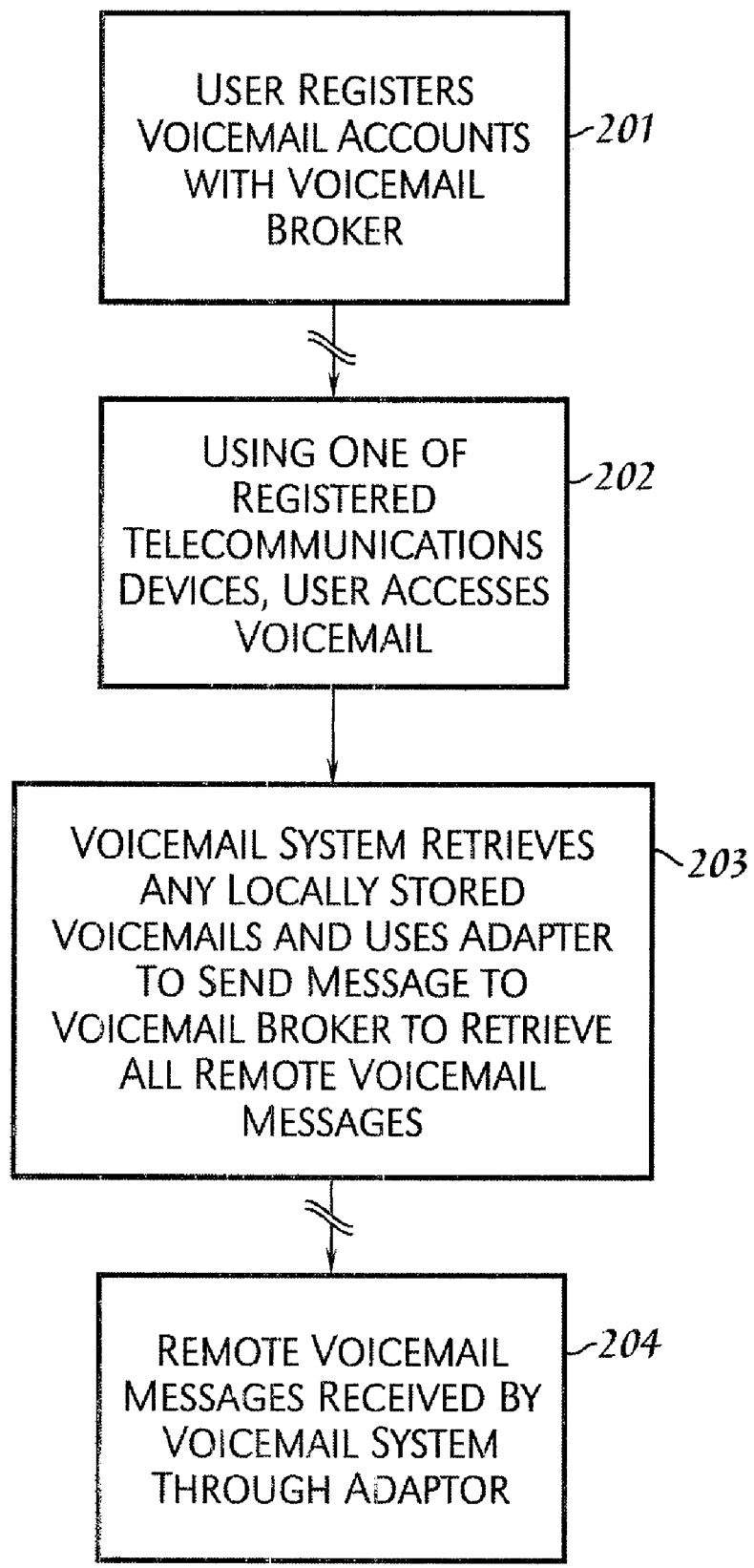
FIG. 2 illustrates processes implemented within a telecommunications device in accordance with an embodiment of the present invention.
Figure 3:
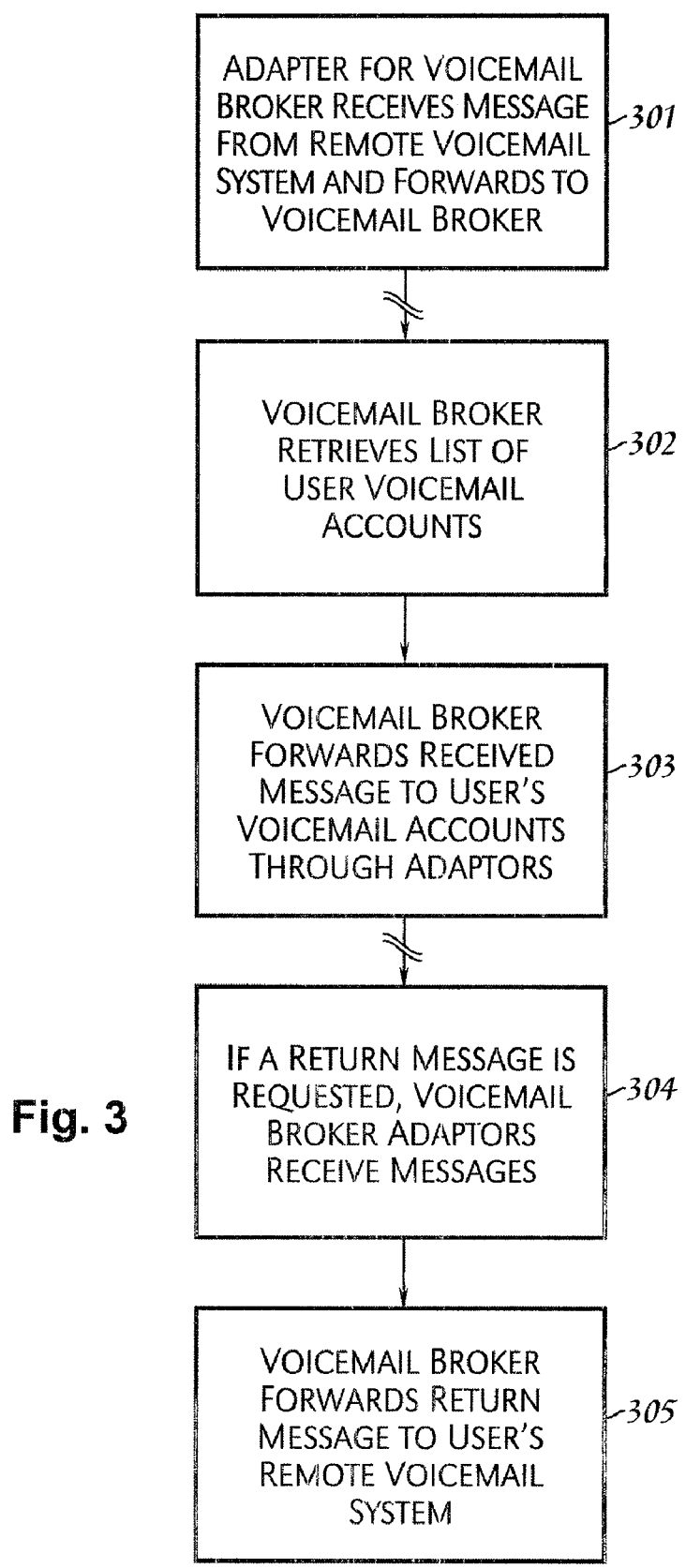
FIG. 3 illustrates processes implemented within a voice mail broker in accordance with an embodiment of the present invention.

Referring to FIG. 2, in step 201, a user may subscribe with a coalescence service provider 110 and create an account which defines the user's various phones subscriptions (such as work, home, cell) and their associated service providers (such as IBM™, SBC™, Sprint PCS™, etc.). Upon subscription to the service 110, the user will then have the ability to manipulate the voice mail "business objects" in various ways, such as retrieving/listening to the voice mail messages, deleting them, saving them, etc.

The user may use any of his/her registered telecommunications devices in step 202 to access the user's voice mail systems. In step 203, the voice mail system in the telecommunications system the user is presently accessing directly may retrieve any locally stored voice mails (for example for VM 103), and will then communicate with the voice mail broker 101, through the appropriate interface adapter, to retrieve all remote voice mail messages. Adapters are responsible for communication with a remote system at all levels of the Open Systems Interconnection (OSI) model. That is, the adapters are required to go as low-level as physical network translation and as high-level as content and application specific communication patterns. The adapters used to implement this invention may span the gamut of available technologies. In one embodiment, at a hardware layer, an adapter may be required to physically dial and interact with a DTMF voice mail system. At an application level, the adapters may be configured to mediate the various application-level intricacies of the various providers (e.g., always generate the DTMF tone 7 for delete and 9 for save when on a Cingular™ voice mail system). The adapters handle all communication, and determine how to communicate based upon the messages they receive directly from the broker (e.g., in the form of Business Objects). The appropriate interface adapter sends a message to the integration voice mail broker 101, such as "get_messages(user=Bob)." An interface adapter in 101 receives the message from the adapter and forwards it to the voice mail broker process running on a data processing system (see FIG. 4 using a suitable protocol). For example, the interface adapter could retrieve the message over the Internet as SIP/SDP packets in a VoIP stream, physical modem access to a legacy system without any higher-level access mechanisms, or a static WAV or MP3 file transmitted directly from the voice mail system. The interface broker receives the message from the remote voice mail system in step 301 and then in step 302 retrieves a list of the user's voice mail accounts. There may be several different ways for brokers to handle message passing. As an example, WebSphere™ Business Integration Server Foundation can (as one potentially messaging option) may use WebSphere™ MQ dedicated messaging, which guarantee message delivery that the system drops onto a "queue" and then receives on the "other end" of the queue. The system can queue up messages to different parts of itself in this manner. In a Websphere™ MQ environment, the messages are transmitted as a binary object, and may be translated back and forth into a more usable format such as XML. WebSphere™ MQ makes up only a portion of the total messaging for the broker; other messages are passed as part of the normal inter-process communication provided by the J2EE specification that WebSphere™ Business Integration Server Foundation implements and uses.

The voice mail broker 101 in step 303 then forwards the received message to the user's remote voice mail accounts through each of the adapters. For instance, the voice mail broker 101 may contact voice mail system 103 with a get_messages message using the DTMF interface adapter 104. In step 304, if a return message is requested, then the voice mail broker adapters (104, 106, 107, 109) receive the return messages from the remote voice mail systems. In this instance, what is received are the voice mail messages from the remote voice mail system. The interface adapter may also convert the return messages into a generic format recognizable by the voice mail broker 101. For example, an adapter could take any input format (SIP/SDP stream, inbound analog voice stream, etc.) and encode/reencode it into a more generic format, such as WAV or MP3 for storage within the broker's database. These generalized formats would be more interchangeable than the various custom formats offered by the various service providers. For example, an SDP stream may be re-encoded into a static WAV format file to be housed at the broker. WAV files are digitally encoded audio files that are universally recognized as a standard format for storing audio data and as such can be readily consumed by the vast majority of digital audio processing software. As each set of voice mail messages is returned to the voice mail broker 101, the broker then combines the voice mail messages and sends them back to the user's voice mail system in step 305. This is a "coalescence" of the voice mails from the various service providers. As the individual adapters gather the voice mail messages from all the various adapters, the hub collects and collates the voice mail messages so that they are readily available to be accessed by any of the normal access methods (such as inbound requests to retrieve voice mail from any of the constituent adapters). This step is a voice mail "workflow" component of the broker which allows one to manipulate the voice mail data (messages) received from the external systems. A voice mail workflow is created within the computational context of the broker which collects voice mail data for a user, and then later presents it to the user for retrieval. In step 204, the user receives the remote voice mail messages through the appropriate adapter, and can then manipulate such voice mail messages as previously described. The interface adapter may also convert the generic format of the voice mail messages into a format recognizable by the particular remote voice mail system. This is the opposite of the encoding/reencoding above. Instead of taking a specific stream and making it a generic format, the generic format (e.g., a WAV or MP3) is dynamically reencoded for the specific system on the particular voice mail system. Thus, the Cingular™ wireless adapter, for example, might take a WAV file and "play" the WAV file over the analog phone line to a user on their cell phone calling in to retrieve their messages.

Figure 5:
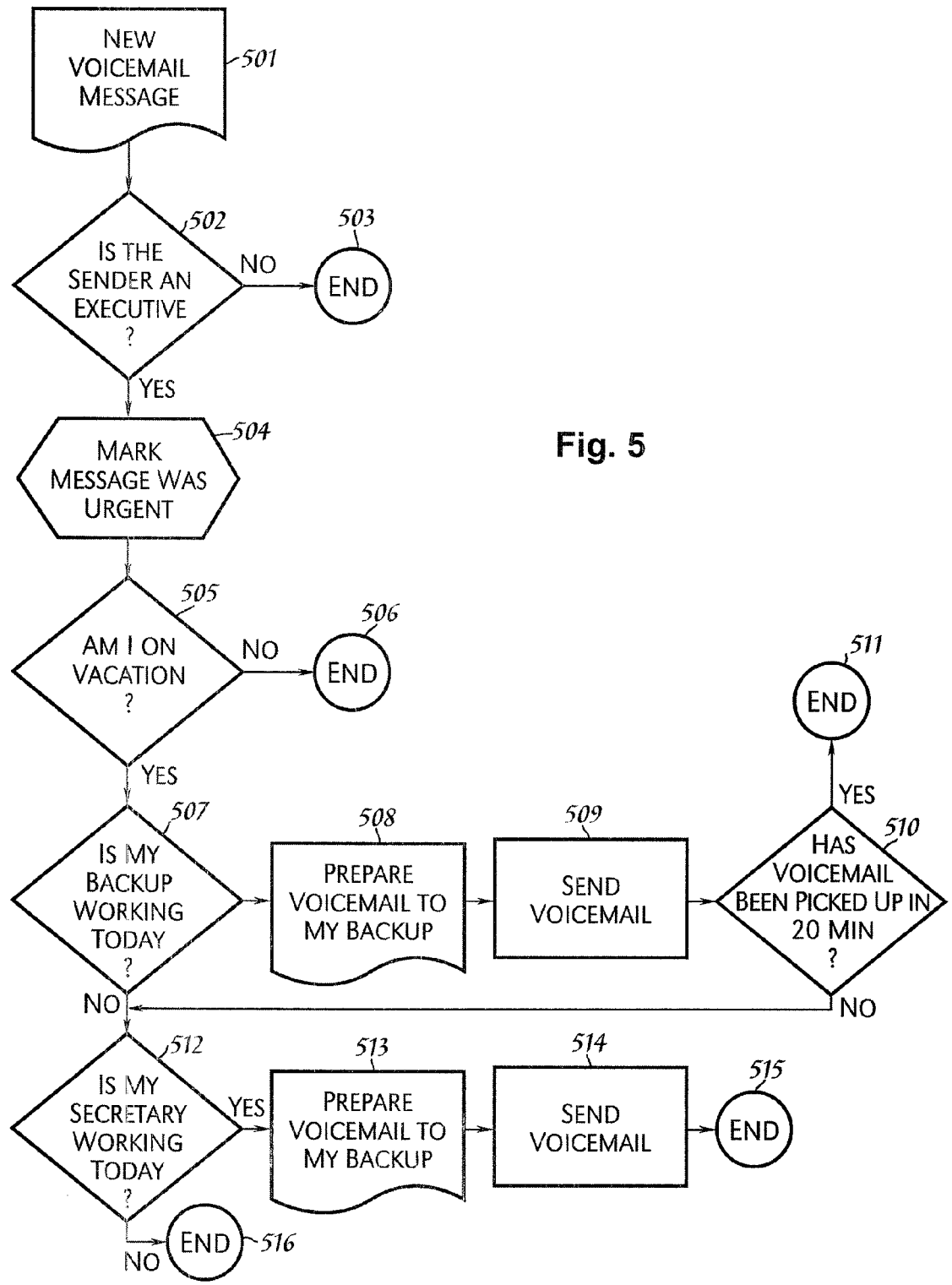
FIG. 5 illustrates an exemplary process of a workflow system in accordance with an embodiment of the present invention.

FIG. 5 illustrates a flow diagram of an example of a workflow process for managing voice mail messages in accordance with an embodiment of the present invention. The actual process flow would be created by the user of the voice-mail broker. The process could be customized at any time by the user of the system to reflect the their preferences for message handling. The work flow process would commence execution at the time the broker receives a voice mail from one of the external voicemail systems. All execution of the process would take place within the computational context of the broker. This process flow illustrates a receiver that wants to be very responsive to priority voice mail received from an executive. If a new voice mail message arrives at the broker from one of the external voicemail systems, in step 501, and the sender is an executive as determined by step 502, the message is then marked as urgent in step 504. Otherwise, the process ends at step 503. If the receiver of the voice message is on vacation as determined by step 505, then the message is forwarded to the receiver's designated backup person in step 507. Otherwise, the process ends at step 506. If the backup person is working on that particular day, then the voice mail is prepared for sending to the backup in step 508, and the voice mail is sent to the backup person's voice mailbox in step 509. If the backup person does not check their voice mail within twenty minutes (step 510), then the voice mail is forwarded to the receiver's secretary, as an example, in step 512. Otherwise, the process ends at step 511 if the voice mail is picked up within the twenty minute time period. Step 513 and 514 are similar to steps 508 and 509. The process can either end at steps 515 or 516. Additionally, other steps may be implemented such as one similar to step 510 for the secretary position.

This process demonstrates the value of employing a process workflow broker that can be readily configured based upon user preferences. The utility of the workflow within the broker could be dramatically extended by integrating it with additional relevant external data sources, for example, the corporate directory (to query if the sender is an executive and query who are the receiver's backup and secretary). It also shows integration with a corporate calendaring software (to query if the receiver is on vacation, and if the backup and secretary are working that day). Also, the system may monitor sent voice mails for return receipts (to see if the voice mail has been picked up within a certain amount of time).

Figure 4:
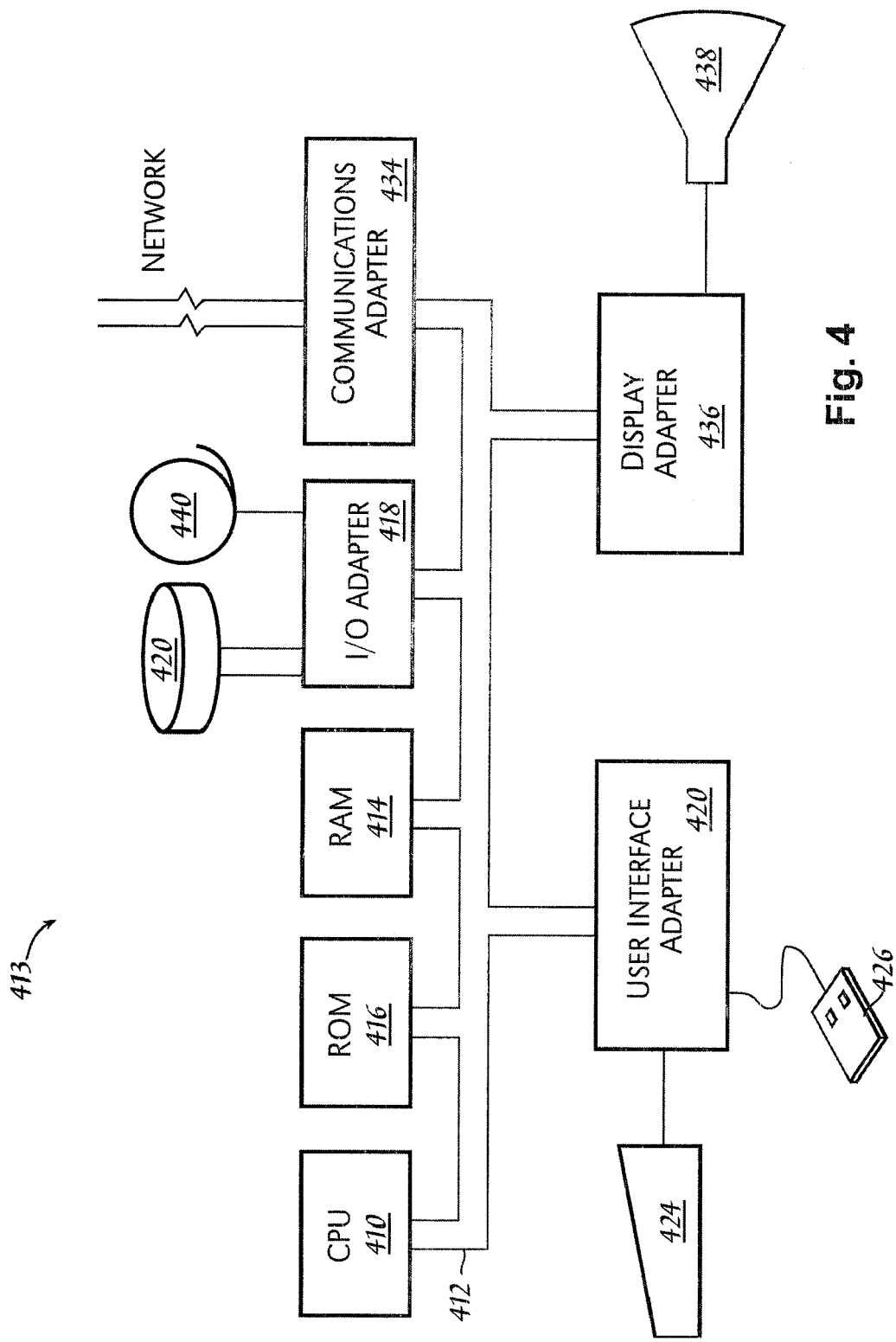
FIG. 4 illustrates a data processing system configured in accordance with an embodiment of the present invention.

The business process hub implementing the voice mail broker 101, and the coalescence service provider 110 may be implemented within data processing systems such as illustrated in FIG. 4. Naturally, the various telecommunications devices and systems described above may also be implemented within similar data processing systems.

Referring to FIG. 4, an example is shown of a data processing system 400 which may be used for the invention. The system has a central processing unit (CPU) 410, which is coupled to various other components by system bus 412. Read only memory ("ROM") 416 is coupled to the system bus 412 and includes a basic input/output system ("BIOS") that controls certain basic functions of the data processing system 400. Random access memory ("RAM") 414, I/O adapter 418, and communications adapter 434 are also coupled to the system bus 412. I/O adapter 418 may be a small computer system interface ("SCSI") adapter that communicates with a disk storage device 420. Communications adapter 434 interconnects bus 412 with an outside network enabling the data processing system to communicate with other such systems. Input/Output devices are also connected to system bus 412 via user interface adapter 422 and display adapter 436. Keyboard 424, mouse 426 and speaker 428 are all interconnected to bus 412 via user interface adapter 422. Display monitor 438 is connected to system bus 412 by display adapter 436. In this manner, a user is capable of inputting to the system throughout the keyboard 424 or mouse 426 and receiving output from the system via speaker 428 and display 438.

Implementations of the invention include implementations as a computer system programmed to execute the method or methods described herein, and as a computer program product. According to the computer system implementation, sets of instructions for executing the method or methods may be resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A system for handling a plurality of voice mail systems, comprising:
    a voice mail broker;
    a plurality of voice mail systems operating independently of each other, and each coupled to the voice mail broker through an adapter so that each of the plurality of voice mail systems communicate messages to and from the voice mail broker;
    means for at least one voice mail system sending to the voice mail broker a request to retrieve voice mail messages;
    means for the voice mail broker to manipulate the request, including reencoding to and from generic formats;
    means for the voice mail broker forwarding the request to other voice mail systems within the plurality of voice mail systems;
    means for the voice mail broker receiving a remote voice mail message sent by any of the plurality of voice mail systems; and
    means for the voice mail broker forwarding the received remote voice mail messages to the one of the voice mail systems that sent the request to the voice mail broker to retrieve voice mail messages pertaining to the user of the voice mail system sending the request.

2. The system as recited in claim 1, further comprising:
    means for playing in the at least one voice mail system a voice mail message received from the voice mail broker.

3. The system as recited in claim 1, further comprising:
    means for associating multiple adapters with the voice mail broker.

4. The system as recited in claim 1, wherein the adapter is selected from the group consisting of a DTMF adapter, a VoIP adapter, and a web service adapter.

5. A method for coalescing voice mail messages for a user through a voice mail broker coupled to first and second voice mail systems operating independently of each other, comprising the steps of:
    sending from the first voice mail system to the voice mail broker a request to retrieve a voice mail message sent to the user in the second voice mail system;
    the voice mail broker manipulating the requests;
    the voice mail broker forwarding the request to the second voice mail system;
    the voice mail broker receiving the voice mail message sent by the second voice mail system in response to the forwarded request; and
    the voice mail broker forwarding the received voice mail message to the first voice mail system.

6. The method as recited in claim 5, further comprising the step of:
    the first voice mail system playing the received voice mail message to the user.

7. A voice mail broker comprising:
    adapters for coupling to a plurality of voice mail systems operating independently of each other, the adapters configured so that each of the plurality of voice mail systems communicate messages to and from the voice mail broker;
    circuitry for receiving from one of the plurality of voice mail systems to the voice mail broker a request to retrieve voice mail messages pertaining to a user of the voice mail system sending the request;
    circuitry for manipulating the inbound and outbout requests while they are within a computational context of the broker;
    circuitry for forwarding the request to the user's other voice mail systems within the plurality of voice mail systems;
    circuitry for receiving remote voice mail messages sent by the user's other voice mail systems within the plurality of voice mail systems; and
    circuitry for forwarding the received remote voice mail messages to the one of the voice mail systems that sent the request to the voice mail broker to retrieve voice mail messages pertaining to the user of the voice mail system sending the request.

8. The voice mail broker as recited in claim 7, further comprising:
    circuitry for determining which of the plurality of voice mail systems pertain to the user.

9. The voice mail broker as recited in claim 7, wherein one of the adapters is a DTMF adapter.

10. The voice mail broker as recited in claim 7, wherein one of the adapters is a VoIP adapter.

11. The voice mail broker as recited in claim 7, wherein one of the adapters is a web service adapter.

12. A computer program product stored on a computer readable medium for implementing a voice mail broker, comprising the program steps of:
    receiving from one of a plurality of voice mail systems a request to retrieve voice mail messages pertaining to a user of the voice mail system sending the request;
    manipulating the inbound and outbound requests while they are in the computational domain of the voice mail broker;
    forwarding the request to the user's other voice mail systems within the plurality of voice mail systems;
    receiving remote voice mail messages sent by the user's other voice mail systems within the plurality of voice mail systems; and
    forwarding the received remote voice mail messages to the one of the voice mail systems that sent the request to the voice mail broker to retrieve voice mail messages pertaining to the user of the voice mail system sending the request.

13. A computer program product as recited in claim 12, further comprising the program steps of:
    determining which of the plurality of voice mail systems pertain to the user.

* * * * *